United States Patent Office 3,431,174
Patented Mar. 4, 1969

3,431,174
SYNTHESIS OF STEROIDS
Samuel C. Pan, Metuchen, Pacifico A. Principe, South River, and Barbara Junta, Somerset, N.J., assignors to E. R. Squibb & Sons, Inc., New York, N.Y., a corporation of Delaware
No Drawing. Filed Oct. 22, 1965, Ser. No. 502,304
U.S. Cl. 195—51         7 Claims
Int. Cl. C12b 1/00

ABSTRACT OF THE DISCLOSURE 16-hydroxyestranes are prepared by a two-step process which involves first 16-hydroxylating a 10-nor-$\Delta^4$-androstene by treatment with the enzymes of a 16-hydroxylating microorganism, and then subjecting the 16-hydroxy compound formed to the action of enzymes of a 1-dehydrogenating microorganism.

---

This invention relates to and has for its object the provision of an improved process for preparing 16-hydroxyestranes.

It has now been found that a 19-nor-$\Delta^4$-androstene may be converted to a 16-hydroxyestrane derivative in high yield by a two-step process without any substantial formation of undesired by-products. In essence, therefore, the process of this invention entails subjecting a 19-nor-$\Delta^4$-androstene to the action of enzymes of a 16-hydroxylating microorganism, whereby a corresponding 16-hydroxy-19-nor-$\Delta^4$-androstene derivative is formed; and subjecting the latter to the action of enzymes of a 1-dehydrogenating microorganism, to yield the desired 16-hydroxyestrane final product.

Among the suitable starting steroids are included any of the 19-nor-$\Delta^4$-androstenes. The preferred starting steroids, however, are the 3,17-dioxygenated-19-nor-$\Delta^4$-androstenes, such as 19-nor-$\Delta^4$-androstenes-3,17-dione, 19-nortestosterone, 19-nor-17a-methyltestosterone and 19-nor-17a-ethynyltestosterone.

In the first step of the process of this invention, the steroid substrate is subjected to the action of the enzymes of a 16-hydroxylating microorganism, the reaction being carried out in the usual manner by culturing the microorganism in the presence of the steroid, or by treating the steroid with non-proliferating cells of the microorganism, or by intermixing the steroid with 16-hydroxylating enzymes previously obtained from the microorganism. The conditions for such microbial reaction are well known in the art and are similar to those specified in U.S. Patent 3,179,698.

Any 16-hydroxylating microorganism can be used as the source of the 16-hydroxylating enzyme. Such microorganisms include, inter alia, 16α-hydroxylating microorganisms, such as *Streptomyces roseachromogenes*, *Hypomyces aurantius*, *Pestalotia funerea*, *Streptomyces viridis*, *Streptomyces olivaceus* and *Streptomyces californicus*, and 16β-hydroxylating microorganisms, such as *Aspergillus niger*, *Mycospaerella latebrosa*, *Botrytis cinerea*, *Aspergillus ochraceus* and *Wojnowicia graminis*.

The process results in the preparation of the 16-hydroxy-19-nor-$\Delta^4$-androstene intermediates. The preferred intermediates are the 16-hydroxy-3,17-dioxygenated-19-nor-$\Delta^4$-androstenes, such as 19-nor-$\Delta^4$-androstene-16α (or β)-ol-3,17-dione, 16α (or 16β)-hydroxy-19-nortestosterone, 16α (or 16β)-hydroxy-19-nor-17α-methyltestosterone, and 16α (or 16β)-hydroxy-19-nor-17α-ethynyltestosterone.

These 16-hydroxy-19-nor-$\Delta^4$-androstenes are then subjected to the action of enzymes of 1-dehydrogenating microorganisms, to yield the desired 16-hydroxyestrane final products, the reaction being carried out in the usual manner by culturing the microorganism in the presence of the steroid, or by treating the steroid with non-proliferating cells of the microorganism, or by intermixing the steroid with 1-dehydrogenating enzymes previously obtained from the microorganism. Optimally, the dehydrogenation is conducted with cell-free extracts of 1-dehydrogenating microorganisms, as by the method and with the enzymes described in U.S. Patent No. 3,047,469.

The second step of the process results in the formation of the final products, namely the 16-hydroxyestrane derivatives, and preferably the 16-hydroxy-3,17-dioxygenated estranes, such as 16α (or 16β)-hydroxyestrone, 16α (or 16β)-hydroxyestradiol, 16α (or 16β)-hydroxy-17α methylestradiol and 16α (or 16β)-hydroxy-17α-ethynylestradiol. These final products are useful as, or in the preparation of, estrogenic agents, being used for the same manner as estrone.

The following examples illustrate the invention (all temperatures being in centigrade):

EXAMPLE 1

16α-hydroxy-19-nor-$\Delta^4$-androstene-3,17-dione (A) *Fermentation.*—Surface growth from each of 2 10-day old agar slant cultures of *Streptimyces roseochromogenes* (ATCC–13400), the slant containing as a nutrient medium (A):

|  | Grams |
|---|---|
| Glucose | 10 |
| Yeast extract | 2.5 |
| $K_2HPO_4$ | 1 |
| Agar | 20 |
| Distilled water to 1 liter. | | is suspended in 5 ml of a 0.01% sodium lauryl sulfate aqueous solution. One ml. portions of the suspension are used to inoculate eight 250 ml. conical flasks, each containing 50 ml. of the following sterilized medium (B):

|  | Grams |
|---|---|
| Glucose | 30 |
| Soybean meal | 20 |
| Soybean oil | 2.2 |
| $CaCO_3$ | 2.5 |
| Distilled water to 1 liter. | |

After 72 hours of incubation at 25° with continuous rotary agitation (280 cycles/minutes, 2 inch stroke) 10% (vol./vol.) transfers are made to 34 250-ml. conical flasks each containing 50 ml. of freshly sterilized medium B. After 24 hours of further incubation, using the same conditions as described above, the steroid (300 micrograms/ml.) is added by supplementing each flask with 0.25 ml. of a sterile solution (60 mg./ml.) of 19-nor-$\Delta^4$-androstene-3-17-dione in N,N-dimethylformamide. A total of 510 mg. is fermented. After approximately 78 hours of further incubation, using identical conditions as described above, the fermentation is harvested. The contents of the flasks are pooled through a Seitz clarifying pad. The flasks, mycelium and pads are washed with successive 50 ml. portions of warm water. The combined filtrate and washings have a volume of 2000 ml.

(B) *Isolation and characterization.*—The combined filtrate and washings (2000 ml.) are extracted three times with 500 ml. portions of chloroform. The combined chloroform extracts are washed with water, dried over anhydrous sodium sulfate and concentrated to dryness under vacuum, leaving about 300 mg. of crude product. This material is chromatographed on a thin layer of Silica Gel GF (Merck) with chloroform containing 5% (by volume) methanol as the developing solvent. The major UV-absorbing band is eluted with a 1:1 (by volume) mixture of methanol and chloroform. After evaporating off the solvent, the residue is partitioned between chloroform and 1:1 (by volume) mixture of water and methanol. The chloroform phase, upon evaporation under vacuum to dryness, yields crystalline 16α-hydroxy-19-nor-Δ⁴-androstene-3,17-dione. It is recrystallized from acetone-hexane to yield about 210 mg. of the pure product, M.P. about 138–140°; [α]$_D$ +16° (chloroform).

EXAMPLE 2

Following the procedure of Example 1, but substituting *Hypomyces aurantius* (CBS) (Centraal bureau voor Schimmelcultures, Baarn, Netherlands) for the *Streptomyces roseochromogenes*, 16α-hydroxy-19-nor-Δ⁴-androstene-3,17-dione, having an M.P. of about 138–140° is obtained.

Similarly, by following the procedure of Example 1, but substituting the following microorganisms for the Streptomyces used in the example, 16α-hydroxy-19-nor-Δ⁴-androstene-3,17-dione is obtained: *Streptomyces viridis* ATCC–3372, *Pestalotia funerea* (Dept. of Botany, Kansas State University, Manhattan, Kans.), *Streptomyces olivaceus* ATCC–11626, and *Streptomyces californicus* ATCC–3312.

EXAMPLE 3

16α-hydroxyestrone by growing culture of *Corynebacterium simplex*

(A) Fermentation.—Surface growth from a two-week old agar slant of *Corynebacterium simplex* (ATCC–6946), the slants containing as a nutrient medium (A):

| | Grams |
|---|---|
| Glucose | 10 |
| Yeast extract | 2.5 |
| K$_2$HPO$_4$ | 1 |
| Agar | 20 |
| Distilled water to 1 liter. | | is suspended in 5 ml. of 0.01% aqueous sodium lauryl sulfate solution. One ml. portions of this suspension are used to inoculate four 250 ml. Erlenmeyer flasks, each containing 50 ml. of the following sterilized medium (B):

| | Grams |
|---|---|
| Beef extract | 1.5 |
| Yeast extract | 3 |
| Peptone | 6 |
| Dextrose | 1 |
| Distilled water to 1 liter. | |

After 24 hours of incubation at 25° with continuous rotary agitation (280 cycles/minutes; 2 inch stroke), 5% (vol./vol.) transfers are made to eight 250 ml. Erlenmeyer flasks, each containing 50 ml. of freshly sterilized medium B. After 24 hours of further incubation, using the same conditions as described above, the steroid (500 micrograms/ml.) is added by supplementing each flask with 0.25 ml. of a sterile solution (100 mg./ml.) of 16α-hydroxy-19-nor-Δ⁴-androstene-3,17-dione in N,N-dimethylformamide. A total of 200 mg. is fermented. After 48 hours of further incubation, using identical conditions as described above, the contents of the flasks are pooled and the broth is extracted three times with 200 ml. portions of methyl isobutyl ketone. Upon evaporation of the combined extract under vacuum to dryness, crystalline 16α-hydroxyestrone is obtained. It is recrystallized twice from acetone-hexane to yield about 180 mg. of the pure product, M.P. 214° [α]$_D$ +175° (ethanol).

EXAMPLE 4

16α-hydroxyestrone by cell-free enzyme preparation from *Corynebacterium simplex*

Following the procedure of Example 3 with the exception that either 16α-hydroxy-19-norandrostenedione or progesterone is added, the cells of the culture of *Corynebacterium simplex* are harvested at the end of 72 hours by centrifugation for 10 minutes at 2000×G. The supernatant is decanted off and the cells are placed in a mortar along with an equal amount by weight of alumina (finely powdered) and treated in a Raytheon magneto-strictive oscillator for 20 minutes. The sonicated mixture is centrifuged for 10 minutes at 2000×G to remove the cell debris and alumina.

16α-hydroxy-19-norandrostenedione (1 mg.), 2,6-dichlorophenol indophenol (500 μg.) or other hydrogen acceptor, such as 2-methylnaphthoquinone and 2.0 ml. of the cell-free ring A dehydrogenase preparation, described above, are placed in a test tube and brought to a volume of 5.0 ml. with a 0.03 M sodium phosphate buffer. The mixture is allowed to stand for one hour at 30° C. after which it is twice extracted with 1 ml. of methyl isobutyl ketone. The combined extract is chromatographed on paper using ethylene glycol as the stationary phase and benzene as the mobile phase. A spot moving with the same R$_f$ (0.12) and exhibiting the same characteristic color reactions as the 16α-hydroxyestrone obtained in Example 3 is observed.

EXAMPLE 5

16β-hydroxy-19-nortestosterone (A) Fermentation.—Surface growth from each of 4 10-day old agar slant cultures of *Aspergillus niger* (ATCC–9142), the slant containing as a nutrient medium (A):

| | Grams |
|---|---|
| Glucose | 10 |
| Yeast extract | 2.5 |
| K$_2$HPO$_4$ | 1 |
| Agar | 20 |
| Distilled water to 1 liter. | | is suspended in 5 ml. of a 0.01% sodium lauryl sulfate aqueous solution. One ml. portions of the suspension are used to inoculate ten 250 ml. conical flasks, each containing 50 ml. of the following sterilized medium (B):

| | Grams |
|---|---|
| Dextrose | 10 |
| Cornsteep liquor | 6 |
| NH$_4$H$_2$PO$_4$ | 3 |
| Yeast extract | 2.5 |
| CaCO$_3$ | 2.5 |
| Distilled water to 1 liter. | |

After 72 hours of incubation at 25° with continuous rotary agitation (280 cycles per minute; 2 inch stroke), 10% (vol./vol.) transfers are made to 66 250-ml. conical flasks each containing 50 ml. of freshly sterilized medium B plus 300 micrograms/ml. of 19-nor-testosterone. The steroid is added by supplementing each flask with 0.25 ml. of a sterile solution of the steroid in N,N-dimethylformamide containing 60 mg./ml. of steroid. A total of 1.0 gram is used. After 72 hours of further incubation, the contents of the flasks are pooled to give a total volume of 3,300 ml.

(B) Isolation and characterization.—The broth (3,300 ml.) is extracted three times with 800 ml. portions of chloroform. The combined chloroform extracts are washed with water, dried over anhydrous sodium sulfate and concentrated to dryness under vacuum, leaving about 520 mg. of crude product. This material is chromatographed on a thin layer of Silica Gel GF (Merck) with chloroform containing 5% (by volume) methanol as the developing solvent. The major UV-absorbing band is eluted with a 1:1 (by volume) mixture of methanol and chloroform. After evaporating off the solvent the residue is partitioned between chloroform and a 1:1 (by volume) mixture of water and methanol. The chloroform phase, upon evaporation under vacuum to dryness, yields crystalline 16β-hydroxy-19-nortestosterone. It is recrystallized from acetone-hexane to yield about 420 mg. of the pure product, M.P. about 151–154°; [α]$_D$ +55° (chroroform).

EXAMPLE 6

Following the procedure of Example 5, but substituting *Mycosphaerella latebrosa* (CBS) Centraal bureau voor Schimmelcultures, Baarn, Netherlands for the *Aspergillus niger*, 16β-hedroxy-19-nortestosterone, having a M.P. of about 151–154° is obtained.

Other organisms found to 16β-hydroxylate 19-nortestosterone are: *Botrytis cinerea* (ATCC–12481), *Aspergillus ochraceus* (NRRL–416), *Wojnowicia graminis* (CBS) (Centraal bureau voor Schimmelcultures, Baarn, Netherlands).

Moreover, by substituting the following steroid substrates for the 19-nortestosterone in the procedure of Example 5, the indicated product is obtained:

Steroid substrate— Product
  19 - nor - 17α - methyl-
    testosterone _____ 16β - hydroxy - 19 - nor 17α-methyltestosterone.
  19 - nor - 17α - ethynyl-
    testosterone _____ 16β - hydroxy - 19 - nor 17α-ethynyltestosterone.

EXAMPLE 7

16-epiestriol by growing culture of *Corynebacterium simplex*

(A) Fermentation.—Surface growth from a two-week old agar slant of *Corynebacterium simplex* (ATCC–6946), the slants containing as a nutrient medium (A):

|  | Grams |
|---|---|
| Glucose | 10 |
| Yeast extract | 2.5 |
| $K_2HPO_4$ | 1 |
| Agar | 20 |
| Distilled water to 1 liter. | | is suspended in 5 ml. of 0.01% aqueous sodium lauryl sulfate solution. One ml. portions of this suspension are used to inoculate four 250 ml. Erlenmeyer flasks, each containing 50 ml. of the following sterilized medium (B):

|  | Grams |
|---|---|
| Beef extract | 1.5 |
| Yeast extract | 3 |
| Peptone | 6 |
| Dextrose | 1 |
| Distilled water to 1 liter | |

After 24 hours of incubation at 25° with continuous rotary agitation (280 cycles/minutes; 2 inch stroke), 5% (vol./vol.) transfers are made to eight 250 ml. Erlenmeyer flasks, each containing 50 ml. of freshly sterilized medium B. After 24 hours of further incubation, using the same conditions as described above, the steroid (500 micrograms/ml.) is added by supplementing each flask with 0.25 ml. of a sterile solution (100 mg./ml.) of 16β-hydroxy-19-nortestosterone, in N,N-dimethylformamide. A total of 200 mg. is fermented. After 48 hours of further incubation, using identical conditions as described above, the contents of the flasks are pooled, and the broth is extracted three times with 200 ml. portions of methyl isobutyl ketone. Upon evaporation of the combined extract under vacuum to dryness, crystalline 16-epiestriol-($\Delta^{1,3,5(10)}$-estratrien-3,16β,17β-triol) is obtained. It is recrystallized twice from acetone-hexane to yield about 180 mg. of the pure product, M.P. 275–278°, $[\alpha]_D$ +86° (ethanol).

EXAMPLE 8

16-epiestriol by cell-free enzyme preparation from *Corynebacterium simplex*

Following the procedure of Example 7 with the exception that either 16β-hydroxy-19-nortestosterone or progesterone is added, the cells of the culture of *Corynebacterium simplex* are harvested at the end of 72 hours by centrifugation for 10 minutes at 2000×G. The supernatant is decanted off and the cells are placed in a mortar along with an equal amount of weight of alumina (finely powdered) and treated in a Raytheon magneto-strictive oscillator for 20 minutes. The sonicated mixture is centrifuged for 10 minutes at 2000×G to remove the cell debris and alumina.

16β-hydroxy-19-nortestosterone (1 mg.), 2,6-dichlorophenol indophenol (500 μg.) or other hydrogen acceptor, such as 2-methylnaphthoquinone and 2.0 ml. of the cell-free ring A dehydrogenase preparation, described above, are placed in a test tube and brought to a volume of 5.0 ml. with a 0.03 M sodium phosphate buffer. The mixture is allowed to stand for one hour at 30° C. after which it is twice extracted with 1 ml. of methyl isobutyl ketone. The combined extract is chromatographed on paper using ethylene glycol as the stationary phase and chloroform as the mobile phase. A spot moving with the same $R_f$ (0.15) and exhibiting the same characteristic color reactions as the 16-epiestriol obtained in Example 7 is observed.

Similarly, by following the procedures of Example 7 or 8, but substituting 16β-hydroxy-19-nor-17α-methyltestosterone and 16β-hydroxy-19-nor-17α-ethynyltestosterone for the 16β-hydroxy-19-nortestosterone, the corresponding 16-epiestriol derivatives are obtained.

Similarly, by substituting the following 1-dehydrogenating microorganisms for the *Corynebacterium simplex* in Examples 7 and 8, the same products are formed: *Nocardia restrictus* ATCC–14887, *Pseudomonas testosteroni* ATCC–11996, *Cylindrocarpon radicicola* ATCC–11011, and *Mycobacterium rhodochrous* ATCC–4277.

The invention may be variously otherwise embodied within the scope of the appended claims.

What is claimed is:

1. A process for preparing a 16β-hydroxy-$\Delta^{1,3,5(10)}$-estratriene, which comprises subjecting a 19-nor-$\Delta^4$-androstene serially to the action of enzymes of *Aspergillus niger* and enzymes of a 1-dehydrogenating microorganism and recovering the 16β hydroxylated steroid.

2. The process of claim 1, wherein the androstene is a 3,17-dioxygenated-19-nor-$\Delta^4$-androstene.

3. The process of claim 1, wherein the androstene is 19-nor-$\Delta^4$-androstene-3,17-dine.

4. The process of claim 1, wherein the androstene is 19-nortestosterone.

5. A process for preparing a 16β-hydroxy-19-nor-$\Delta^4$-androstene, which comprises subjecting a 19-nor-$\Delta^4$-androstene to the action of enzymes of *Aspergillus niger* and recovering the 16β hydroxylated steroid.

6. The process of claim 5, wherein the androstene is a 3,17-dioxygenated-19-nor-$\Delta^4$-androstene.

7. The process of claim 5, wherein the androstene is 19-nortestosterone.

References Cited

UNITED STATES PATENTS

| | | |
|---|---|---|
| 2,855,343 | 10/1958 | Fried et al. |
| 3,031,445 | 4/1962 | Szpilfogel et al. |
| 3,047,469 | 7/1962 | Sih et al. |
| 3,188,325 | 6/1965 | Amici et al. |
| 2,844,513 | 7/1958 | Wettstein et al. _____ 195—51 |
| 2,902,410 | 9/1959 | Weintraub et al. |
| 2,928,850 | 3/1960 | Herzog et al. |
| 3,214,448 | 10/1965 | Holmlund et al. |
| 3,254,098 | 5/1966 | Edwards et al. |

ALVIN E. TANENHOLTZ, *Primary Examiner.*